United States Patent
Leung et al.

[11] Patent Number: 5,593,949
[45] Date of Patent: Jan. 14, 1997

[54] HIGH TEMPERATURE CONDUCTOR PROBES FOR DETERMINING LIQUID LEVEL OF CRYOGENS

[75] Inventors: Eddie M. Leung, San Diego; Kenneth R. Dawson, Alpine, both of Calif.

[73] Assignee: Lockheed Martin Corporation, Bethesda, Md.

[21] Appl. No.: 251,211

[22] Filed: May 31, 1994

Related U.S. Application Data

[63] Continuation-in-part of Ser. No. 86,585, Jul. 6, 1993, abandoned.

[51] Int. Cl.$^6$ .............................. G01F 23/24; H01L 39/04
[52] U.S. Cl. .................... 505/160; 73/295; 73/304 R; 338/80; 505/842; 505/847
[58] Field of Search .................... 73/295, 304 R; 505/842, 843, 847, 160; 338/80, 94, 151, 156, 222

[56] References Cited

U.S. PATENT DOCUMENTS

| | | | |
|---|---|---|---|
| 2,456,617 | 12/1948 | Burch | 73/295 |
| 3,205,709 | 9/1965 | Gearing et al. | 73/295 |
| 3,496,773 | 2/1970 | Cornish | 73/295 |
| 3,943,767 | 3/1976 | Efferson | 505/842 |
| 4,118,984 | 10/1978 | Kuraoka et al. | 73/295 |
| 4,566,323 | 1/1986 | Masumoto et al. | 73/295 |
| 4,655,079 | 4/1987 | Masumoto et al. | 73/295 |
| 4,716,762 | 1/1988 | Eynard | 73/295 |
| 4,745,806 | 5/1988 | Masumoto et al. | 73/295 |
| 4,944,183 | 7/1990 | Masumoto et al. | 505/847 |
| 5,114,907 | 5/1992 | Erwin et al. | 73/295 |

FOREIGN PATENT DOCUMENTS

| | | | |
|---|---|---|---|
| 0076120 | 4/1983 | European Pat. Off. | 73/304 R |
| 0071914 | 5/1980 | Japan | 73/304 R |
| 0093024 | 7/1980 | Japan | 73/304 R |
| 0103324 | 8/1981 | Japan | 73/304 R |
| 0147018 | 11/1981 | Japan | 73/304 R |
| 0164924 | 12/1981 | Japan | 73/295 |
| 0166220 | 10/1983 | Japan | 73/295 |
| 0111926 | 6/1985 | Japan | 73/304 R |
| 0181619 | 9/1985 | Japan | 73/295 |
| 1138423 | 5/1989 | Japan | 73/295 |
| 1138424 | 5/1989 | Japan | 73/295 |
| 0647542 | 2/1979 | U.S.S.R. | 73/295 |

OTHER PUBLICATIONS

Efferson, K., "A Superconducting (Nb—Ti) liquid helium level detector," Proc. 1969 Cryogenic Engineering Conference, Los Angeles, CA. USA (16–18 Jun. 1969).

Permyakov, U. et al., "A device for controlling the operation of a metal helium cryostat," Cryogenics, vol. 12, No. 2 (Apr. 1972).

*Primary Examiner*—Diego F. F. Gutierrez
*Attorney, Agent, or Firm*—John R. Duncan; Frank D. Gilliam

[57] ABSTRACT

Method and arrangement for detecting the level of a liquid cryogen having a predetermined boiling point and which is being held in a container relative to the bottom of the container. The arrangement includes a container which receives the liquid cryogen and a longitudinal extending sensing member having a length extending from the bottom of the container to a level that is greater than any depth experienced for the liquid cryogen. The sensing member is vertically disposed in the container with one end in contact with the bottom of the container and the other end extending out of the liquid cryogen. The sensing member is composed of a high temperature superconductor material having a critical temperature that is higher than the predetermined boiling point of a selected cryogen. An electrical current is passed through the sensing member and the voltage drop across the sensing member is measured. The voltage drop is representative of the portion of the sensing member extending above the level of the liquid cryogen and thereby is indicative of the level of the liquid cryogen presently contained within the container.

19 Claims, 1 Drawing Sheet

5,593,949

HIGH TEMPERATURE CONDUCTOR PROBES FOR DETERMINING LIQUID LEVEL OF CRYOGENS

CROSS REFERENCE TO THE RELATED APPLICATIONS

This application is a continuation in part of U.S. patent application Ser. No. 08/086,585, filed Jul. 6, 1993, now abandoned.

BACKGROUND OF THE INVENTION

The present invention relates to an improvement in the field of liquid level detectors for cryogens and more particularly to a novel method and arrangement utilizing a high temperature superconductor material in liquid cryogen level detector.

It has been known in the past to use a superconductor material that has a low critical temperature in a liquid level detector for liquid helium. Such a detector has been satisfactory for applications for low liquid helium consumption but has not been applied to applications involving cryogens having a boiling point above the critical temperature of the superconductor and has been limited only to the detecting the level of liquid helium.

With respect to launch vehicles for space vehicles, the present method of measuring the level of liquid helium utilizes a capacitance probe. Although relatively simple in concept, this arrangement requires expensive hardware because of the extremely close tolerances involved in the capacitance probe.

Thus, a present need exists for a practical method and arrangement for detecting the level of liquid cryogens having boiling points above the critical temperature of a low temperature superconductor used in liquid level detectors for cryogens, especially as used for launch vehicles for space applications.

SUMMARY OF THE INVENTION

Briefly stated, the present invention contemplates a novel method and arrangement for detecting the level of a liquid cryogen having a boiling point that exceeds the critical temperature of the low temperature superconductor material that has been employed in the past in probes to determine the liquid level of cryogens. The arrangement includes a container adapted to receive a liquid cryogen having a predetermined boiling point with the container being configured to provide a uniform depth of the liquid cryogen contained within the container. A hollow cylinder is positioned vertically within the container and extends above any anticipated level of the liquid cryogen. The cylinder is provided with a plurality of apertures along its length so that the level of the liquid cryogen assumes the level of the cryogen within the container.

A longitudinally extending sensing member having a uniform cross section and composed of a high temperature superconductor material having a critical temperature that exceeds the boiling temperature of any liquid cryogen to held within the container is positioned within the cylinder so that its lower end is generally coterminous with the lower end of the cylinder and the bottom of the container. The superconductor is substantially rigid and self-supporting. The sensing assembly may be mounted in the container in any suitable manner, using brackets, welding or the like to maintain the sensing assembly in position despite movement of a vehicle, such as a space vehicle, in which the sensing assembly is carried.

An electrical means is connected to the sensing member to pass a predetermined electrical current through the length of the sensing member which is in its superconducting state over the length that is immersed in the liquid cryogen. The electrical means measures the voltage drop across the sensing member in response to the electrical current with the voltage drop being representative of that portion of the sensing member extending above the surface of the liquid cryogen and thereby indicative of the depth of the liquid cryogen within the container.

While yttrium barium copper oxide may be used as the high temperature superconductor material used in probes to detect the level of liquid nitrogen, liquid hydrogen, or liquid oxygen in applications such as launch vehicles other high temperature superconductor materials are contemplated for use with other liquid cryogens having advanced boiling points. Bi based compounds and Thallium based compounds may be used to advantage in those applications.

While an obvious use of the invention would be for launch vehicles for space vehicles, it could also be used in mobile containers of liquid cryogens having advanced boiling points or in stationary applications of such liquid cryogens.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWING

For a fuller understanding of the nature and objects of the invention, reference should be had to the following detailed description taken in conjunction with the accompanying drawing in which:

The FIGURE shows an arrangement for detecting the level of a liquid cryogen constructed in accordance with a preferred embodiment of the invention.

DETAILED DESCRIPTION OF THE DRAWING

Figure 1:
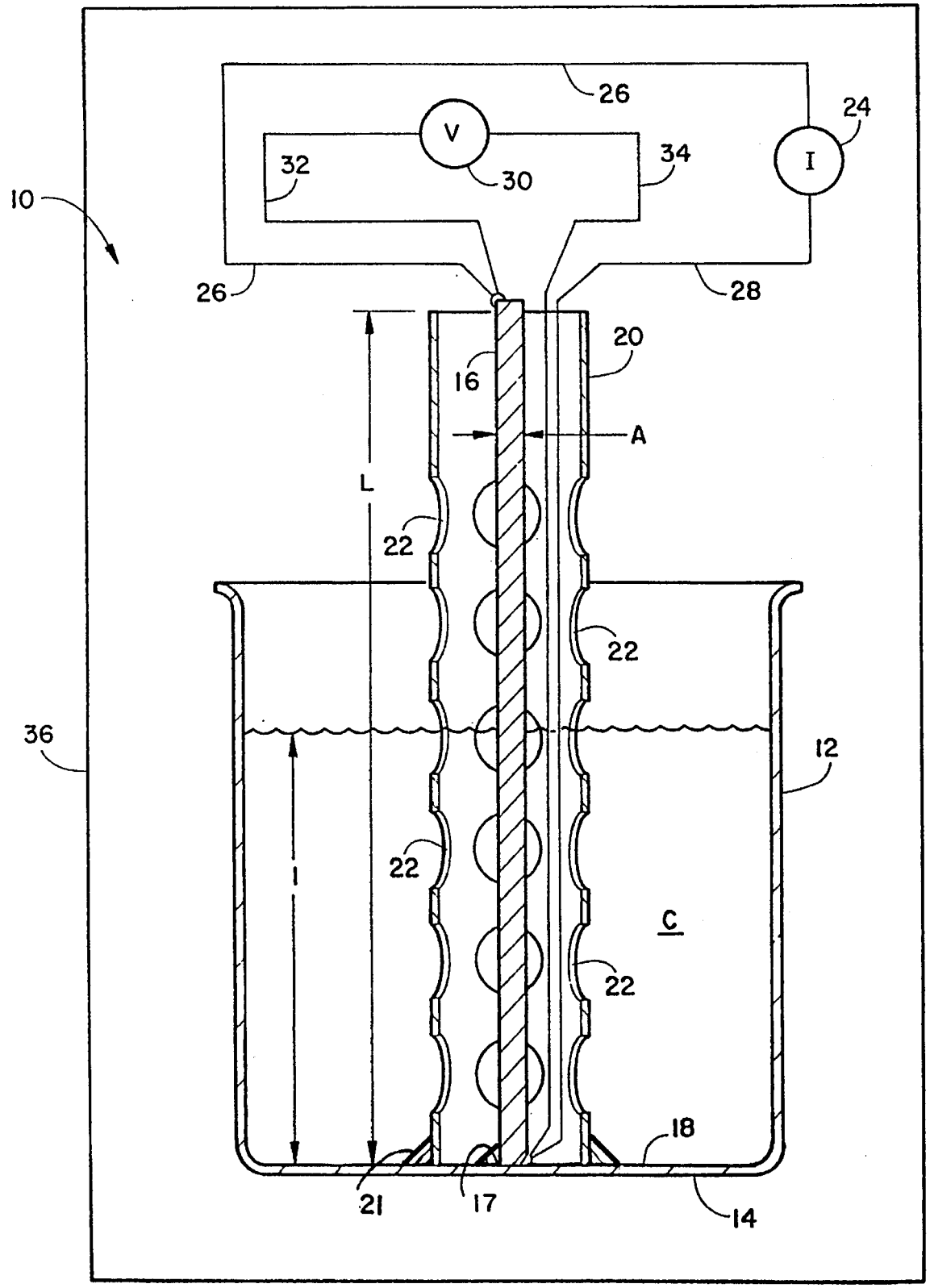

Referring now to the FIGURE in detail, reference character 10 generally designates an arrangement constructed in accordance with a preferred embodiment of the invention for carrying out the novel method disclosed herein. The liquid cryogen probe of arrangement 10 includes a suitable container 12 that is preferably provided with a generally flat bottom 14 whereby a liquid cryogen C that is received within the container 12 assumes a uniform depth 1. The liquid cryogen A has a predetermined boiling point which for example would be 20.4 K. for liquid hydrogen, 27.1 K. for liquid Neon, 77.4 K. for liquid nitrogen, 81.7 K. for liquid carbon monoxide, 85.2 K. for liquid Fluorine, 87.3 K. for liquid Argon, and 90.2 K. for liquid oxygen.

A longitudinally extending sensing member 16 having a constant cross section A over its predetermined length L is vertically disposed in the liquid cryogen C and normal to the surface of such cryogen. The sensing member 16 is composed of a suitable high temperature superconductor material that has a critical temperature that exceeds the boiling point of any cryogen C to contained within the container 12. The sensing member 16 is disposed in the container 12 so that its lower end rests on the inner floor surface 18 of the container 12 so that such lower end of the sensing member 16 is coterminous with the lowest depth of the liquid cryogen C. The sensing member 16 is substantially rigid and self supporting. Sensing member can stand upright as shown in a stationary container. However, when used in a moving vehicle, such as a space vehicle, a weld bead 17 or conventional supporting brackets may be used to hold the sensing member in place during vehicle movement, it being remembered that the showing in the Figure is schematic in nature and does not include all ancillary equipment that could be used by those skilled in the art.

The high temperature superconductor material of the sensing member 16 is preferably a material such as yttrium barium copper oxide (YBaCuO) which has a critical temperature of 92 K. and would be suitable for use in determining the liquid level of the above noted cryogens. In the event the cryogen is one that has a boiling point higher that of YBaCuO such as liquid methane having a boiling point of 111.7 K., liquid Krypton which has a boiling point of 119.9 K. or liquid nitric oxide which has a boiling point of 121.4 K. then the sensing member 16 would be composed of a higher temperature superconductor material such as the Bi based compounds which have a critical temperature of 105 K. or the Thallium based compounds which have a,critical temperature of 125 K. In any instance, the high temperature superconductor material of the sensing member is determined so that its critical temperature exceeds the boiling point of the cryogen contained in the container 12. A low temperature superconductor material such as Niobium Titanium (NbTi) which has a critical temperature of 10 K and that has been used in the past in detecting liquid levels of cryogens could not be used for present purposes.

The sensing member 16 is enclosed in a porous hollow cylinder 20 which is generally the same length L as the sensing member. The hollow cylinder 20 is provided with a plurality of pores or apertures 22 which are arranged longitudinally along the length of the cylinder 20 so that the liquid cryogen may enter the cylinder 20 and surround the sensing member 16 to the same level as the depth 1 of the cryogen C in the container 12. Cylinder 20 could be welded to the bottom of container 12 as indicated at weld bead 21 or supported by conventional brackets, as desired, if used in a movable vehicle A suitable electrical means is provided to pass a predetermined direct electrical current through the length of the sensing member 16. In the FIGURE this means takes the form of a suitable variable source of direct electric current 24 which is coupled by leads 26 and 28 to opposing ends of the sensing member 16. Preferably, the leads 26 and 28 are connected by silver solder to the ends of the sensing member 16. A suitable voltmeter 34 is connected by leads 32 and 34 to opposing ends of the sensing member 16 and indicates the voltage drop across the length of the sensing member 16 when the current source 24 passes a predetermined level of current through the sensing member 16. Obviously, the length of the sensing member 16 that is immersed in the cryogen C will be in a superconducting state and well have an accordingly extremely low resistance so that the voltage drop indicated on the voltmeter 30 will be representative of the length of the sensing member 16 that extends above the level of the cryogen C.

Accordingly, the voltage measured by the voltmeter 30 is proportional to the liquid level of the cryogen C since it is equal to the value of the current passing through the sensing member 16 times the resistivity $\epsilon$ of the high temperature superconductor material of the sensing member 16 measure just above its critical temperature times the length L of the sensing member 16 less the depth 1 of the cryogen divided by the cross sectional area of the sensing member 16.

Thus, the depth of the cryogen is given by $$V = I\epsilon(L-l/A) \ l = I\epsilon - \lceil VA/I\epsilon \rceil + L.$$

The liquid level probe 10 is shown surrounded by box 36 which is symbolic of the many vehicles with which the present invention may be advantageously employed. For example, the box 36 may represent a space launch vehicle wherein the liquid hydrogen and liquid oxygen are the major fuels and the exact levels of such liquids in the fuel tanks are important. Tankers are commonly employed to transport liquid methane and liquid nitrogen so that the box 36 could be representative of such mobile means. Similarly, certain presently contemplated vehicles such as the National Aerospace Plane (NASP) will use liquid hydrogen as will liquid hydrogen powered automobiles.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A method of detecting the level of a liquid cryogen having a predetermined boiling point and held in a container which comprises:

positioning a longitudinally extending, self-supporting, sensing member, composed of a high temperature superconductor material having a cross sectional area of A, a predetermined length L, a resistivity $\epsilon$ and a critical temperature that exceeds the boiling point of the liquid cryogen, vertically in a body of the liquid cryogen and normal to the surface of the liquid cryogen, said liquid cryogen being held in a container having a relatively flat bottom inner surface against which the lower end of said sensing member is maintained in contact;

positioning a porous protective sheathing around the high temperature superconductor member so that the level of the liquid cryogen within the container penetrates said sheathing to surround said high temperature superconductor member and assume the same level within the sheathing as in the container and causing the portion of the sensing member below the level of the liquid cryogen to reach its superconducting state;

passing an electrical current having a predetermined value through the length of the high temperature superconductor member;

measuring the voltage drop across such member in response to the passage of electrical current therethrough; and determining the level of the liquid cryogen within the container according to the voltage drop measured across said high temperature superconductor member.

2. The method as defined in claim 1 wherein the level of the liquid cryogen within the container is determined on the basis that the voltage is directly proportional to the level of the liquid cryogen and the voltage is determined as being equal to the value of the electrical current passed through the high temperature superconductor sensing member times the electrical resistance of such member as it is directly affected by the depth of the liquid cryogen within said container.

3. The method as defined in claim 1 wherein electrical resistance of such sensing member as it is directly affected by the depth of the liquid cryogen within the container is determined by the resistivity of the high temperature superconducting material of the sensing member times the length of such member minus the depth of the liquid cryogen within the container divided by the cross-sectional area of such member.

4. The method as defined in claim 1 wherein the critical temperature of the high temperature superconductor material of the sensing member is above 90 K.

5. The method as defined in claim 1 wherein the high temperature superconductor material of the sensing member is yttrium barium copper oxide.

6. The method as defined in claim 5 wherein the liquid cryogen is liquid hydrogen.

7. The method as defined in claim 5 wherein the liquid cryogen is liquid Neon.

8. The method as defined in claim 5 wherein the liquid cryogen is liquid nitrogen.

9. The method as defined in claim 5 wherein the liquid cryogen is liquid carbon monoxide.

10. The method as defined in claim 5 wherein the liquid cryogen is liquid argon.

11. The method as defined in claim 5 wherein the liquid cryogen is liquid oxygen.

12. The method as defined in claim 5 wherein the high temperature superconductor is a Thallium based compound having a critical temperature about 125 K.

13. An arrangement for detecting the level of a liquid cryogen having a predetermined boiling point and held in a container which comprises:

a container adapted to receive a liquid cryogen having a predetermined boiling point, said container configured to provide a uniform depth of the liquid cryogen within said container;

a longitudinally extending self-supporting sensing member having a predetermined length and having a uniform cross section over its length and being composed of a high temperature superconductor material that has a critical temperature that exceeds the boiling point of the liquid cryogen, said member being vertically positioned within the container so that one end contacts the bottom of the container and the other end extends normally to the surface of the liquid cryogen;

a hollow tube provided with a plurality of apertures longitudinally extending along the tube and positioned vertically within the container to surround said superconductor member, and electrical means coupled to the superconductor sensing member and adapted to pass an electrical current through said superconductor member whereby the voltage drop across the length of the superconductor member that is not in its superconducting state due to being immersed in the liquid cryogen is representative of the depth of the liquid cryogen within said container.

14. The arrangement as defined in claim 13 wherein the arrangement is adapted to be carried by a land based vehicle.

15. The arrangement as defined in claim 14 wherein the arrangement is adapted to be carried aboard a space vehicle.

16. The arrangement as defined in claim 13 wherein the high temperature superconductor material of the sensing member is yttrium barium copper oxide having a critical temperature around 92 K.

17. The arrangement as defined in claim 13 wherein the high temperature superconducting material of the sensing member is a bismuth based compound having a critical temperature around 105 K.

18. The arrangement as defined in claim 13 wherein the high temperature superconducting material of the sensing member is a thallium based compound having a critical temperature around 5 K.

19. The arrangement as defined in claim 13 wherein the cryogen received within the container is liquid hydrogen.

* * * * *